United States Patent [19]

Defuans

[11] Patent Number: 4,525,039
[45] Date of Patent: Jun. 25, 1985

[54] OBJECTIVE LENS

[76] Inventor: Jean-Louis Defuans, 9 Avenue du Bourcet, 38240 Meylan, France

[21] Appl. No.: 468,583

[22] Filed: Feb. 22, 1983

[30] Foreign Application Priority Data

Feb. 19, 1982 [FR] France .................................. 82 02803

[51] Int. Cl.³ ................................................ G02B 9/60
[52] U.S. Cl. ...................................... 350/465; 350/449
[58] Field of Search ............... 350/449, 450, 465, 414, 350/418, 410, 426, 462

[56] References Cited

U.S. PATENT DOCUMENTS

| | | | |
|---|---|---|---|
| 2,687,063 | 8/1954 | Coleman | 350/469 |
| 3,485,547 | 12/1969 | Bougon et al. | 350/17 |
| 4,289,385 | 9/1981 | Yamagata | 350/449 |

FOREIGN PATENT DOCUMENTS 1533571  6/1968  France .
2321713 12/1977  France .
271419  10/1950  Switzerland .

Primary Examiner—John K. Corbin
Assistant Examiner—Paul M. Dzierzynski
Attorney, Agent, or Firm—Charles A. Brown; Charles E. Brown

[57] ABSTRACT

An objective lens comprises an iris diaphragm ($D_1$) at the front and an optical assembly disposed behind the iris diaphragm. The optical assembly comprises a plano-convex front lens unit (G) with its plane surface facing the front of the lens, whereby the lens is suitable for use in media with different refractive indices (in practice, air and water). It further comprises a rear lens unit (G') adapted to apply the necessary correction to maintain abberations within reasonable limits and to achieve a required distance from the lens to the focal image plane. The invention is applicable, in particular, to discreet surveillance using a camera.

17 Claims, 1 Drawing Figure

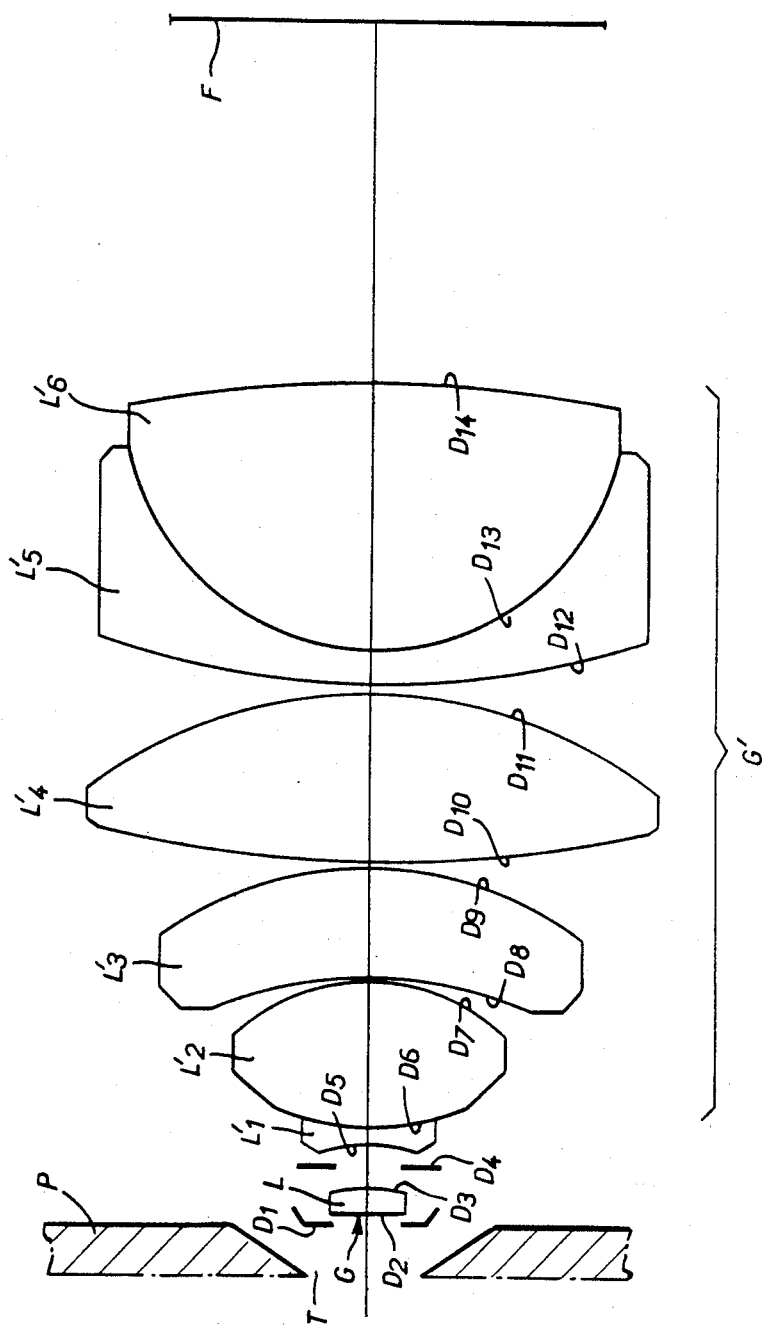

OBJECTIVE LENS

BACKGROUND OF THE INVENTION

1. Field of the Invention

The present invention is concerned with an objective lens for a camera, comprising diaphragm disposed at the front of the lens and an optical assembly disposed behind the diaphragm.

2. Description of the Prior Art

French Pat. No. 2 321 713 filed Aug. 22, 1975 discloses a camera whose essential characteristic is that the iris diaphragm of its objective lens, that is to say the diaphragm of the objective lens which delimits the incident beam and thus conditions the aperture number, is situated in front of the objective lens.

It has become clear that this arrangement, originally devised in order to facilitate and simplify the practical implementation of underwater cameras, can with advantage by applied to cameras for discreet surveillance applications, including still cameras, movie cameras and video cameras, whether the need is for surveillance in an air or water medium, for monitoring the presence of persons therein.

A condition for the success of any surveillance system is that the camera by virtue of which it is exercised be hidden from view of the greatest possible extent.

If, as is usual, the iris diaphragm is disposed inside the objective lens, the entry lens elements thereof are necessarily of relatively large diameter, making it difficult to hide them.

This does not apply if, as described in the aforementioned French patent, the iris diaphragm of the objective lens is situated at the front of the lens.

The entry lens elements of the objective lens may then have a relatively small diameter, and the corresponding camera may thus be easily hidden behind a partition or closet door or any appropriate support, a small hole in the front surface, difficult to see, constituting the iris diaphragm of the objective lens of the camera thus hidden.

In practice, apart from this capacity for being hidden, it is desirable for other constraints to be met to obtain the widest possible application.

First of all, as already mentioned, it is desirable for the objective lens to be equally suitable for use in air or water.

It is also desirable to obtain a relatively large distance between the lens and the corresponding focal image plane to provide for the installation of any necessary accessory device, such as a shutter, reflex mirror or filter, for example.

These requirements are mutually contradictory, and are difficult to reconcile in practice.

In the aforementioned French patent, the objective lens described is in practice suitable only for underwater cameras, and the distance between it and the focal image plane is relatively small.

A general objective of the present invention is to provide an objective lens which provides a particularly satisfactory solution to the problem of meeting the stated requirements.

SUMMARY OF THE INVENTION

The invention consists in an objective lens for a camera, comprising an iris diaphragm disposed at the front of the lens and an optical assembly disposed behind the iris diaphragm and comprising a plano-convex front lens unit with its plane surface facing the front of the lens, whereby the lens is suitable for use in media with different refractive indices, and a rear lens unit adapted to apply the necessary correction to maintain abberations within reasonable limits and to achieve a required distance from the lens to the focal image plane.

The term "lens unit" used herein designates, in the usual manner, an optical component consisting of a single lens, a doublet pair of lenses or a multiple assembly of lenses, and designed to fulfil a specific function.

The plane entry optical surface of the front lens unit of the objective lens in accordance with the invention offers the advantage of enabling the lens to be used equally well in air or in water, and eliminates the unwanted "cat's eye" effect experienced with side lighting, an effect which would be unavoidable if the entry optical surface were curved, by virtue of the resulting focusing action. Also, by virtue of its convex exit optical surface, it provides the advantage of concentrating the incident beam and thus facilitates the minimizing of the inevitable abberations in the rear lens unit.

Thus in practice it has a two-fold function.

As a corollary to this, the rear lens unit of the objective lens in accordance with the invention provides the advantage that, after the divergence of the incident beam which is necessary to its expansion, the consequences of which are minimized, however, as indicated above, by virtue of the convergence previously brought about by the front lens unit, sufficient progressive convergence of the beam is brought about for the required distance to the focal image plane to be obtained.

Thus the objective lens in accordance with the invention represents a particularly advantageous compromise between the various requirements to be fulfilled.

Also, when applied to a camera, it enables the camera to be hidden particularly easily, since its overall dimension may be less than 50 mm, for example, for an iris diaphragm aperture of less than 3 mm, for example, and an overall focal length of the order of 11.3 mm.

Finally, if required, the invention is equally applicable to projection apparatus, for the purpose of projection between two walls, for example.

Other objects and advantages will appear from the following description of an example of the invention, when considered in connection with the accompanying drawing, and the novel features will be particularly pointed out in the appended claims.

IN THE DRAWING

The drawing is a cross-sectioned view in elevation of an objective lens in accordance with the invention, illustrating the application of the latter to a camera.

DESCRIPTION OF THE PREFERRED EMBODIMENT

In the embodiment shown in the drawing, the objective lens in accordance with the invention is used for purposes of surveillance, and is therefore disposed behind a panel or wall P formed for this purpose with a hole T.

For preference, and as shown, this hole T is generally frustoconical, its area increasing from the front towards the rear, with a cone angle sufficient to permit the objective lens in accordance with the invention to be tilted and thus aimed at different points in the field of view, without the incident light beam being obstructed.

In an alternative arrangement (not shown) particularly suitable for applications other than discreet surveillance, diaphragm $D_1$ may, for example, be formed by the rear surface of panel or wall P, the area of the frusto-conical hole T in which then decreases from the front towards the rear.

Be this as it may, as shown in the drawing, the objective lens in accordance with the invention is formed by a series of component parts, optical surfaces or diaphragms.

First of all, at the front, is a diaphragm $D_1$ constituting the iris diaphragm.

As represented schematically in full line in the drawing, diaphragm $D_1$ forms an integral part of the objective lens support device or body-tube, which will not be described in detail herein.

In practice, assuming a overall focal length of 1 mm, the effective aperture diameter of diaphragm $D_1$ may be of the order of 0.26 mm.

To the rear of diaphragm $D_1$, the objective lens in accordance with the invention comprises an optical assembly whose optical components are, in accordance with the invention, grouped and combined to form a front lens unit G and a rear lens unit G'.

In accordance with the invention, front lens unit G is plano-convex with its plane surface facing the front, that is to say towards diaphragm $D_1$.

In practice, in the embodiment shown, front lens unit G consists of a single plano-convex lens L which, in the usual manner, is defined by two optical surfaces, namely an optical surface $D_2$ which constitutes its front surface and which is plane, and an optical surface $D_3$ which constitutes its rear surface and which is convex.

Lens L has a refractive index of 1.45 and an Abbe number of 68. It may, for example, be manufactured from the material marketed under the trade name "Herasil", this kind of material having advantageous chemical and physical properties enabling it to withstand corrosive and abrasive environments so as to permit surveillance of such environments.

Assuming, by way of illustrative example, an overall focal length of 1 mm, it is at a distance from diaphragm $D_1$ consituting the iris diaphragm, as measured relative to its entry optical surface $D_2$, between 0.02 and 0.04 mm, its thickness at the center is between 0.08 and 0.11 mm, and the radius of optical surface $D_3$ which constitutes its rear surface is between 0.92 and 0.93 mm.

For preference, and as shown, rear lens unit G' is at a distance from front lens unit G which, as measured between exit optical surface $D_3$ of front lens group G and entry optical surface $D_5$ of rear lens group G', is between 0.14 and 0.18 mm, for an overall focal length of 1 mm.

Also for preference, and as shown, a diaphragm $D_4$ is disposed substantially midway between front lens unit G and rear lens unit G'.

For example, the distance between exit optical surface $D_3$ of front lens unit G and diaphragm $D_4$ may, given the conditions stated, be between 0.07 and 0.09 mm and, likewise, its distance from entry optical surface $D_5$ of rear lens unit G' may be between 0.07 and 0.09 mm.

Be this as it may, the effective diameter of diaphragm $D_4$ is for preference of the order of 0.25 mm, for an overall focal length of 1 mm.

In the embodiment shown, rear lens unit G' comprises a succession of six lenses $L'_1$, $L'_2$, $L'_3$, $L'_4$, $L'_5$, and $L'_6$.

Lens $L'_1$ is biconcave, delimited by an optical surface $D_5$ which constitutes the entry optical surface of rear lens unit G', and which also constitutes its front surface, and an optical surface $D_6$ which constitutes its rear surface.

Given the assumed overall focal length of 1 mm, it has a thickness at the center between 0.06 and 0.08 mm, an entry surface radius between 0.39 and 0.40 mm and an exit surface radius between 1.03 and 1.04 mm.

Its refractive index is in the region of 1.8, its Abbe number is 25, and it may be made, for example, from the optical material with reference E 05-25.

Lens $L'_2$ is biconvex and in contact with the preceding concave lens $L'_1$.

In other words, these two lenses share optical surface $D_6$, which constitutes the exit surface of one and the entry surface of the other.

In addition to optical surface $D_6$, lens $L'_2$ is further delimited by an optical surface $D_7$, which constitutes its exit surface.

Given the assumed overall focal length of 1 mm, lens $L'_2$ has a thickness at the center between 0.49 and 0.51 mm, an inlet surface radius between 1.03 and 1.04 mm and an exit surface radius between 0.71 and 0.72 mm.

Its refractive index is 1.49, its Abbe number is 70, and it may be made, for example, from the optical material with reference A 87-70.

Lens $L'_3$ is concave-convex with its concave side facing preceding lens $L'_3$.

It is defined by two optical surfaces $D_8$ and $D_9$, the former constituting its entry surface and the latter its exit surface.

It is disposed at a distance from preceding lens $L'_2$ which, as measured between corresponding optical surfaces $D_7$ and $D_8$ and given the assumed overall focal length of 1 mm, is between 0.01 and 0.02 mm.

For the assumed overall focal length of 1 mm, it has a thickness at the center between 0.39 and 0.41 mm, an entry surface radius between 1.62 and 1.63 mm and an exit surface radius between 1.28 and 1.29 mm.

Finally, its refractive index is 1.62, its Abbe number is 53, and it may be made, for example, from the optical material with reference C 23-53.

The fourth lens $L'_4$ is biconvex.

It is delimited by optical surfaces $D_{10}$ and $D_{11}$, the former constituting its entry surface and the latter its exit surface. It is disposed at a distance from preceding lens $L'_3$ which, as measured between corresponding optical surfaces $D_9$ and $D_{10}$ and given the assumed overall focal length of 1 mm, is between 0.01 and 0.02 mm.

For the assumed overall focal length of 1 mm, it has a thickness at the center between 0.60 and 0.62 mm, an entry surface radius between 5.08 and 5.14 mm and an exit surface radius between 1.65 and 1.66 mm.

Finally, its refractive index is 1.62, its Abbe number is 53, and it may be made, for example, from the optical material with reference C 23-53.

The fifth lens $L'_5$ is concave-convex, and has its convex side facing preceding lens $L'_4$.

It is defined between two optical surfaces $D_{12}$ and $D_{13}$, the former constituting its entry surface and the latter its exit surface.

Given the assumed overall focal length 1 mm, it is disposed at a distance from preceding lens $L'_4$ which, as measured between corresponding optical surfaces $D_{11}$ and $D_{12}$, is between 0.01 and 0.02 mm.

For the assumed overall total length of 1 mm, it has a thickness at the center between 0.13 and 0.15 mm, an entry surface radius between 3.24 and 3.25 mm and an exit surface radius between 0.89 and 0.90 mm.

Finally, its refractive index is 1.72, its Abbe number is 30, and it may be made, for example, from the optical material with reference D 17-29.

Lens $L'_6$ is biconvex and is in contact with preceding lens $L'_5$.

Optical surface $D_{13}$ thus forms its entry surface, whereas an optical surface $D_{14}$, which is the exit optical surface of rear lens unit $G'$, constitutes its exit surface.

Given the assumed overall focal length of 1 mm, its thickness at the center is between 0.97 and 0.99 mm, its entry surface radius is between 0.89 and 0.90 mm and its exit surface radius is between 5.08 and 5.14 mm.

Finally, its refractive index is 1.62, its Abbe number is 53, and it may be made, for example, from the optical material with reference C 23-53.

Some of the numerical values specified hereinabove are summarized in table Ia below, which lists, for the references of the component parts, optical surfaces or diaphragms in question, the nature of the component and, in millimeters for the assumed overall focal length of 1 mm, the minimum and maximum distances from the adjacent component, the minimum and maximum radius, in the case of an optical surface, and the effective diameter.

In order to specify the orientation of the optical surfaces, the radii are assigned a sign, positive if the radius of the optical surface is on the other side thereof relative to the iris diaphragm, and negative in the contrary case.

Table Ib is based on the same numerical values and the same conditions, but relates these to the lenses involved, giving the distance from a lens to the preceding lens.

Table Ib also gives the nature and refractive index of each lens.

With the values indicated above, the distance between exit optical surface $D_{14}$ and the focal image plane F, as shown in the drawing, is between 1.2 and 1.4 mm for the assumed overall focal length of 1 mm. Its overall dimension is thus between 4.11 and 4.55 mm.

TABLE Ia

| Component (optical surface or diaphragm) | Nature of component | Assumed overall focal length 1 mm | | | | Effective diameter (mm) |
|---|---|---|---|---|---|---|
| | | Distance to next component (mm) | | Radius (optical surface) (mm) | | |
| | | min | max | min | max | |
| $D_1$ | diaphragm | 0.02 | 0.04 | | | 0.259 |
| $D_2$ | surface | 0.08 | 0.11 | ∞ | | 0.28 |
| $D_3$ | surface | 0.07 | 0.09 | −0.93 | −0.92 | 0.28 |
| $D_4$ | diaphragm | 0.07 | 0.09 | | | 0.25 |
| $D_5$ | surface | 0.06 | 0.08 | −0.40 | −0.39 | 0.32 |
| $D_6$ | surface | 0.49 | 0.51 | +1.03 | +1.04 | 0.47 |
| $D_7$ | surface | 0.01 | 0.02 | −0.72 | −0.71 | 0.99 |
| $D_8$ | surface | 0.39 | 0.41 | −1.63 | −1.62 | 1.17 |
| $D_9$ | surface | 0.01 | 0.02 | −1.29 | −1.28 | 1.53 |
| $D_{10}$ | surface | 0.60 | 0.62 | +5.08 | +5.14 | 1.99 |
| $D_{11}$ | surface | 0.01 | 0.02 | −1.66 | −1.65 | 2.07 |
| $D_{12}$ | surface | 0.13 | 0.15 | +3.24 | +3.25 | 1.99 |
| $D_{13}$ | surface | 0.97 | 0.99 | +0.89 | +0.90 | 1.75 |
| $D_{14}$ | surface | | | −5.08 | −5.14 | 1.76 |

Given the above-indicated value for the effective aperture diameter of the iris diaphragm, the aperture number of the objective lens in accordance with the invention is 3.86.

TABLE Ib

| Lens | Distance to preceding lens (mm) | | Nature | Assumed overall focal length 1 mm | | | Radius (mm) | | | |
|---|---|---|---|---|---|---|---|---|---|---|
| | | | | Index | Thickness at centre (mm) | | entry surface | | exit surface | |
| | min | max | | | min | max | min | max | min | max |
| L | | | plano-convex | 1.45 | 0.08 | 0.11 | ∞ | | +0.93 | −0.92 |
| $L'_1$ | 0.14 | 0.18 | biconcave | 1.80 | 0.06 | 0.08 | −0.40 | −0.39 | +1.03 | −1.04 |
| $L'_2$ | 0 | | biconvex | 1.49 | 0.49 | 0.51 | +1.03 | +1.04 | −0.72 | −0.71 |
| $L'_3$ | 0.01 | 0.02 | concave-convex | 1.62 | 0.39 | 0.41 | −1.63 | −1.62 | −1.29 | −1.28 |
| $L'_4$ | 0.01 | 0.02 | biconvex | 1.62 | 0.60 | 0.62 | +5.08 | +5.14 | −1.66 | −1.65 |
| $L'_5$ | 0.01 | 0.02 | concave-convex | 1.72 | 0.13 | 0.15 | +3.24 | +3.25 | +0.89 | +0.90 |
| $L'_6$ | 0 | | biconvex | 1.62 | 0.97 | 0.99 | +0.89 | +0.90 | −5.08 | −5.14 |

The stated values and specifications show that front lens unit G of the objective lens in accordance with the invention is, generally speaking, adapted to use of the latter in media with different refractive indices, and in particular in air just as well as in water, and that rear lens group G' is, generally speaking, adapted to apply the necessary correction to maintain abberations within reasonable limits and to achieve a required value of focal length.

Tables IIa and IIb below give, by way of non-limiting example and in a manner similar to that of tables Ia and Ib above, numerical values for an objective lens with an overall focal length of 11.27 mm which is especially advantageous.

TABLE IIa

| Component (optical surface or diaphragm) | Nature of component | Overall focal length 11.27 mm | | Effective diameter (mm) |
|---|---|---|---|---|
| | | Distance to next component (mm) | Radius (optical surface) (mm) | |
| $D_1$ | diaphragm | 0.4 | | 2.92 |
| $D_2$ | surface | 1.15 | ∞ | 3.10 |
| $D_3$ | surface | 0.87 | −10.43 | 3.10 |
| $D_4$ | diaphragm | 0.99 | | 2.80 |
| $D_5$ | surface | 0.77 | −4.45 | 3.63 |
| $D_6$ | surface | 5.65 | 11.72 | 5.30 |
| $D_7$ | surface | 0.19 | −8.01 | 11.1 |
| $D_8$ | surface | 4.62 | −18.371 | 13.2 |
| $D_9$ | surface | 0.19 | −14.531 | 17.2 |
| $D_{10}$ | surface | 6.92 | 57.652 | 22.4 |
| $D_{11}$ | surface | 0.19 | −18.700 | 23.3 |
| $D_{12}$ | surface | 1.54 | 36.623 | 22.4 |
| $D_{13}$ | surface | 11.00 | 10.110 | 19.7 |

TABLE IIa-continued

| | | Overall focal length 11.27 mm | | |
|---|---|---|---|---|
| Component (optical surface or diaphragm) | Nature of component | Distance to next component (mm) | Radius (optical surface) (mm) | Effective diameter (mm) |
| $D_{14}$ | surface | | −17.652 | 19.8 |

TABLE IIb

| | | Overall focal length 11.27 mm | | | |
|---|---|---|---|---|---|
| | Distance to preceding lens | | | Thickness at centre | Radius (mm) |
| Lens | (mm) | Nature | Index | (mm) | entry surface / exit surface |
| L | | plano-convex | 1.45 | 1.15 | ∞ / −10.43 |
| $L'_1$ | 1.86 | biconcave | 1.80 | 0.77 | −4.45 / 11.72 |
| $L'_2$ | 0 | biconvex | 1.49 | 5.65 | 11.72 / −8.01 |
| $L'_3$ | 0.19 | concave-convex | 1.62 | 4.62 | −18.371 / −14.531 |
| $L'_4$ | 0.19 | biconvex | 1.62 | 6.92 | 57.371 / −18.700 |
| $L'_5$ | 0.19 | concave-convex | 1.72 | 1.54 | 36.623 / 10.110 |
| $L'_6$ | 0 | biconvex | 1.62 | 11 | 10.110 / −57.652 |

The distance to the focal image plane from this objective lens, as defined hereinabove, is then 14.56 mm, and its overall dimension 49 mm.

It will be understood that various changes in the details, materials and arrangements of parts, which have been herein described and illustrated in order to explain the nature of the invention, may be made by those skilled in the art within the principle and scope of the invention as expressed in the appended claims.

For example, lenses could if required be disposed between front lens unit G and rear lens group G', without departing from the scope of the present invention. Likewise, meniscus or biconvex lenses could if required be disposed between lenses $L'_2$ and $L'_5$ of rear lens unit G', without departing from the scope of the present invention.

In all cases, note that in the case of an application to industrial surveillance, the front diaphragm advantageously constitutes mechanical protection for the objective lens and the camera it equips, especially where there is risk of spattering of metal cuttings or other materials.

All numerical values cited in the appended claims relate to an overall focal length of 1 mm. Any actual overall focal length can be reduced to this value by application of the appropriate coefficient of division.

It is claimed:

1. An objective lens for a camera, said lens comprising an iris diaphragm being disposed at the front of said lens and an optical assembly being disposed behind said iris diaphragm, said optical assembly comprising a plano-convex front lens unit with its plane surface facing the front of said lens whereby said lens is suitable for use in media with different refractive indices, and a rear lens unit being adapted to apply the necessary correction to maintain abberations within reasonable limits and to achieve a required distance from said lens to the focal image plane, said iris diaphragm having an effective diameter of 0.25 mm., said plano-convex lens being disposed between 0.02 and 0.04 mm. from said iris diaphragm and having a refractive index of 1.45, an Abbe number of 68 and a thickness at the center between 0.08 and 0.11 mm., and wherein the rear surface of said plano-convex lens has a radius of between 0.92 and 0.93 mm.

2. An objective lens according to claim 1, wherein the effective diameter of said iris diaphragm is of the order of 0.25 mm.

3. An objective lens according to claim 1, wherein said rear lens unit is disposed between 0.14 and 0.18 mm from said front lens unit.

4. An objective lens for a camera, said lens comprising an iris diaphragm being disposed at the front of said lens and an optical assembly being disposed behind said iris diaphragm, said optical assembly comprising a plano-convex front lens unit with its plane surface facing the front of said lens whereby said lens is suitable for use in media with different refractive indices, and a rear lens unit being adapted to apply the necessary correction to maintain abberations within reasonable limits and to achieve a required distance from said lens to the focal image plane, said rear lens unit comprising a biconcave first lens which has a thickness at the center of between 0.06 and 0.08 mm, an entry surface radius of between 0.39 and 0.40 mm, an exit surface radius of between 1.03 and 1.04 mm, a refractive index of 1.80 and an Abbe number of 25.

5. An objective lens according to claim 4, wherein said rear lens unit comprises a biconvex second lens in contact with said first lens and which has a thickness at the center of between 0.49 and 0.51 mm, an entry surface radius of between 1.03 and 1.04 mm, an exit surface radius of between 0.71 and 0.72 mm, a refractive index of 1.49 and an Abbe number of 70.

6. An objective lens according to claim 5, wherein said rear lens unit comprises a concave-convex third lens which has its concave side facing said second lens, which is disposed between 0.01 and 0.02 mm from said second lens and which has a thickness at the center of between 0.39 and 0.41 mm, an entry surface radius of between 1.62 and 1.63 mm, an exit surface radius of between 1.28 and 1.29 mm, a refractive index of 1.62 and an Abbe number of 53.

7. An objective lens according to claim 6, wherein said rear lens unit comprises a biconvex fourth lens which is disposed between 0.01 and 0.02 mm from said third lens and which has a thickness at the center of between 0.60 and 0.62 mm, an entry surface radius of between 5.08 and 5.14 mm, an exit surface radius of between 1.65 and 1.66 mm, a refractive index of 1.62 and an Abbe number of 53.

8. A objective lens according to claim 7, wherein said rear lens units comprises a concave-convex fifth lens which has its convex side facing said fourth lens, which is disposed between 0.01 and 0.02 mm from said fourth lens and which has a thickness at the center of between 0.13 and 0.15 mm, an entry surface radius of between 3.24 and 3.25 mm, an exit surface radius of between 0.89 and 0.90 mm, a refractive index of 1.72 and an Abbe number of 30.

9. An objective lens according to claim 8, wherein said rear lens unit comprises a biconvex sixth lens in contact with said fifth lens and which has a thickness at the center of between 0.97 and 0.99 mm, an entry surface radius of between 0.89 and 0.90 mm, an exit surface radius of between 5.08 and 5.14 mm, a refractive index of 1.62 and an Abbe number of 53.

10. An objective lens according to claim 1, wherein the distance between the focal image plane of the lens and the rearmost surface of said rear lens unit is between 1.2 and 1.4 mm.

11. An objective lens according to claim 4, wherein the effective diameter of said iris diaphragm is of the order of 0.25 mm.

12. An objective lens according to claim 4, wherein said rear lens unit is disposed between 0.14 and 0.18 mm from said front lens unit.

13. An objective lens according to claim 4, wherein the distance between the focal image plane of the lens and the rearmost surface of the said rear lens unit is between 1.2 and 1.4 mm.

14. An objective lens for a camera, said lens comprising an iris diaphragm being disposed at the front of said lens and an optical assembly being disposed behind said iris diaphragm, said optical assembly comprising a plano-convex front lens unit with its plane surface facing the front of said lens whereby said lens is suitable for use in media with different refractive indices, and a rear lens unit being adapted to apply the necesary correction to maintain abberations within reasonable limits and to achieve a required distance from said lens to the focal image plane, said front lens unit comprising a single plano-convex lens with its plane surface facing the front of the lens, and having a thickness at the center of 1.15 mm, a rear surface radius of 10.43 mm and a refractive index of 1.45, and said rear lens unit comprising, in succession, a biconcave first lens which is disposed at a distance of 1.86 mm from a first preceding lens, and having a thickness at the center of 0.77 mm, an entry surface radius of 4.45 mm, an exit surface radius of 11.72 mm and a refractive index of 1.80; a biconcave seconds lens in contact with a second preceding lens and which has a thickness at the center of 5.65 mm, an entry surface radius of 11.72 mm, an exit surface radius of 8.01 mm and a refractive index of 1.49; a concave-convex third lens which is disposed at a distance of 0.19 mm from a third preceding lens with its concave side facing the front, which has a thickness at the center of 4.62 mm, an entry surface radius of 18.371 mm, an exit surface radius of 14.531 mm and a refractive index of 1.62; a biconvex fourth lens which is disposed at a distance of 0.19 mm from a fourth preceding lens, which has a thickness at the center of 6.92 mm, an entry surface radius of 57.652 mm, an exit surface radius of 18.700 mm and a refractive index of 1.62; a concave-convex fifth lens which is disposed at a distance of 0.19 mm from a fifth preceding lens with its convex side facing the front, which has a thickness at the center of 1.54 mm, an entry surface radius of 36.623 mm, an exit surface radius of 10.110 mm, and a refractive index of 1.72; and a biconvex sixth lens in contact with a sixth preceding lens, which has a thickness at the center of 11 mm, an entry surface radius of 10.14 mm, an exit surface radius of 57.652 mm and a refractive index of 1.62, said objective lens having an overall focal length of 11.27 mm and a distance between the rearmost surface of said rear lens units and its focal image plane of 14.56 mm.

15. An objective lens according to claim 14, wherein the effective diameter of said iris diaphragm is of the order of 0.25 mm.

16. An objective lens according to claim 14, wherein said rear lens unit is disposed between 0.14 and 0.18 mm from said front lens unit.

17. An objective lens according to claim 14, wherein the distance between the focal image plane of the lens and the rearmost surface of said rear lens unit is between 1.2 and 1.4 mm.

* * * * *